United States Patent [19]

Boulton

[11] 4,144,370
[45] Mar. 13, 1979

[54] TEXTILE FABRIC AND METHOD OF MANUFACTURING THE SAME

[75] Inventor: Alan H. Boulton, Keyport, N.J.

[73] Assignee: Johnson & Johnson, New Brunswick, N.J.

[21] Appl. No.: 804,414

[22] Filed: Jun. 7, 1977

Related U.S. Application Data

[63] Continuation-in-part of Ser. No. 644,662, Dec. 29, 1975, abandoned.

[51] Int. Cl.$^2$ .............................................. B32B 5/02
[52] U.S. Cl. .................................... 428/233; 28/103; 28/104; 162/115; 428/253; 428/255; 428/284; 428/297; 428/299
[58] Field of Search ............... 428/113, 109, 131, 138, 428/137, 233, 236, 247, 253, 255, 297, 298, 299, 302, 284; 162/115; 28/103, 104

[56] References Cited

U.S. PATENT DOCUMENTS

| | | | |
|---|---|---|---|
| 2,774,127 | 12/1956 | Secrist | 428/326 |
| 2,835,020 | 5/1958 | Doe | 428/233 |
| 2,862,251 | 12/1958 | Kalwaites | 428/357 |
| 2,943,010 | 6/1960 | Stefl et al. | 428/239 |
| 3,214,819 | 11/1965 | Guerin | 28/104 |
| 3,485,706 | 12/1969 | Evans | 428/134 |
| 3,801,396 | 4/1974 | Steenhoridt | 428/233 |

Primary Examiner—James J. Bell
Attorney, Agent, or Firm—Charles J. Metz

[57] ABSTRACT

A double layer, nonapertured textile fabric comprising two integrally entangled layers. The first layer contains fibers arranged to form a pattern of apertures or openings in the layer. The second layer comprises a plurality of entangled areas which are disposed within the apertures of the first layer to form a unitary textile fabric.

15 Claims, 12 Drawing Figures

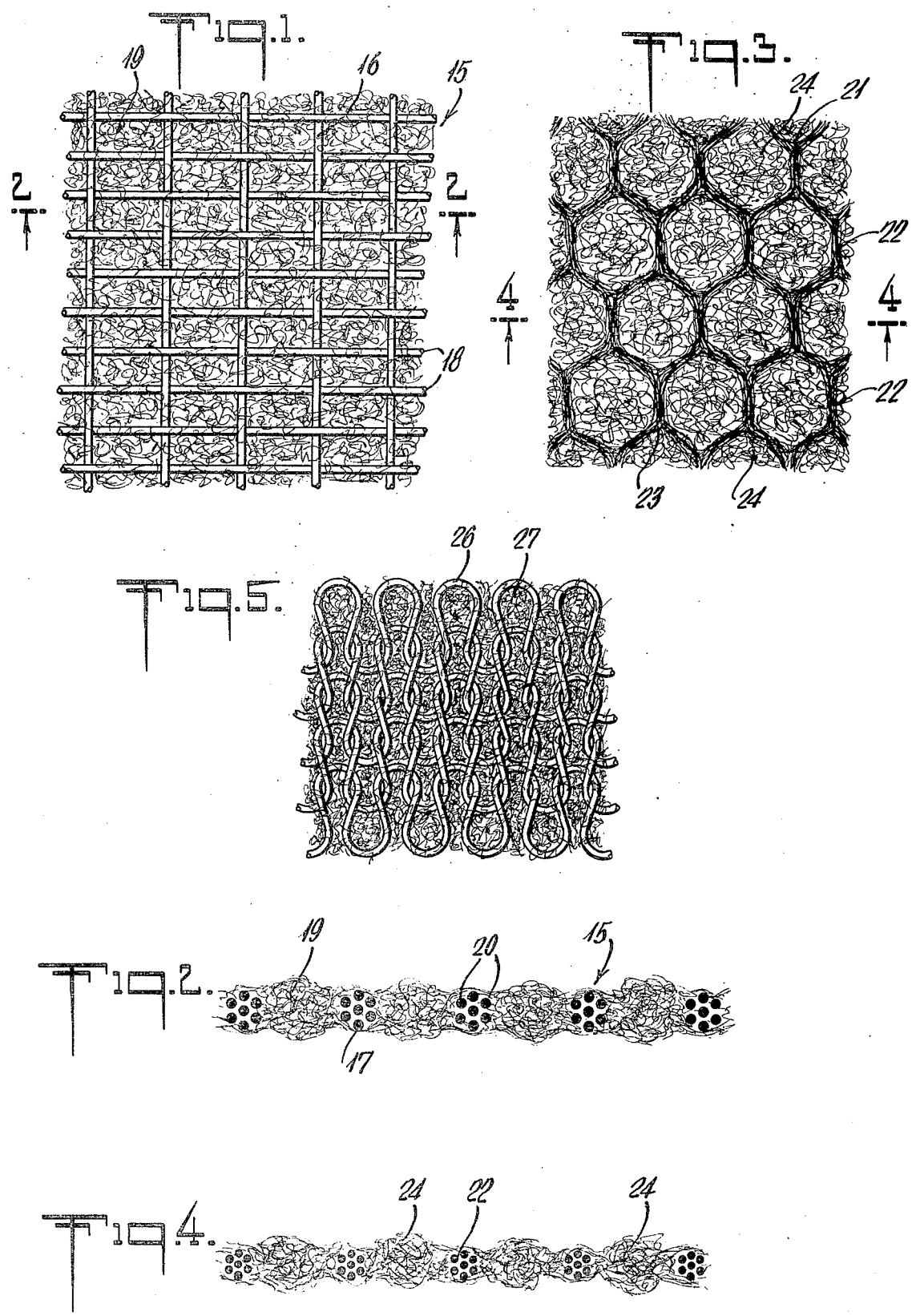

TEXTILE FABRIC AND METHOD OF MANUFACTURING THE SAME

This application is a continutation-in-part of my application Ser. No. 644,662, filed Dec. 29, 1975, now abandoned.

This invention relates to a new nonapertured textile fabric and to methods for manufacturing the same.

Woven and knitted textile fabrics usually have apertures or openings formed by the crossing of yarns or looping of yarns. In certain instances, the apertures may be extremely small or even entirely closed by weaving the yarns in both the warp and the filling direction so close together that they touch. In other instances the fabric may be woven open and then shrunk to close the openings between the yarns, or they may be napped or treated to close the holes. However in most instances, the fabrics will have a regular pattern of openings or apertures or areas wherein the fiber density is much less than in adjacent areas. Sometimes these holes or low density areas may not even be discernible with the naked eye; however, they are discernible under high magnification.

Nonwoven fabrics are primarily a web of loosely assembled fibers held together by a binder. Such a fabric may be considered nonapertured and usually has no uniform pattern of openings. In some instances the web may be treated by various techniques to produce a pattern of openings in the fabric. Also in some instances, especially when using wool fibers, the webs may be shrunken or treated to form felts and produce nonapertured products.

What I have developed is a new type of nonapertured textile fabric. By nonapertured, it is meant that there is no regular repeating pattern of openings in my fabric which are either discernible by the naked eye or under high magnification. The fabric may have areas of varying fiber density which appear in a regular repeating pattern, but there are no openings. Actually there is a pattern of fiber areas in my fabric wherein the fibers are positioned in one type of a configuration and a complementary pattern wherein the fibers are positioned in another configuration.

My new textile fabric comprises a base layer and a second layer substantially coplanar and integrally entangled with said base layer. The base layer comprises a plurality of fibers arranged in a pattern of yarn or yarn-like bundles which define a pattern of apertures in the base layer. The second layer comprises a plurality of highly entangled fiber areas with the fiber areas corresponding to the apertures of the base layer and with portions of fibers from the highly entangled areas being randomly entangled with portions of fibers in the yarn or yarn-like bundles to produce an integral nonapertured textile fabric.

The invention will be more fully described in conjunction with the accompanying drawings wherein:

FIG. 1 is a plan view of the new textile fabric of the present invention;

FIG. 2 is an enlarged cross-sectional view taken along line 2—2 of FIG. 1;

FIG. 3 is another embodiment of the new textile fabric of the present invention;

FIG. 4 is an enlarged cross-sectional view taken along line 4—4 of FIG. 3;

FIG. 5 is another embodiment of the new textile fabric of the present invention;

Figure 6:
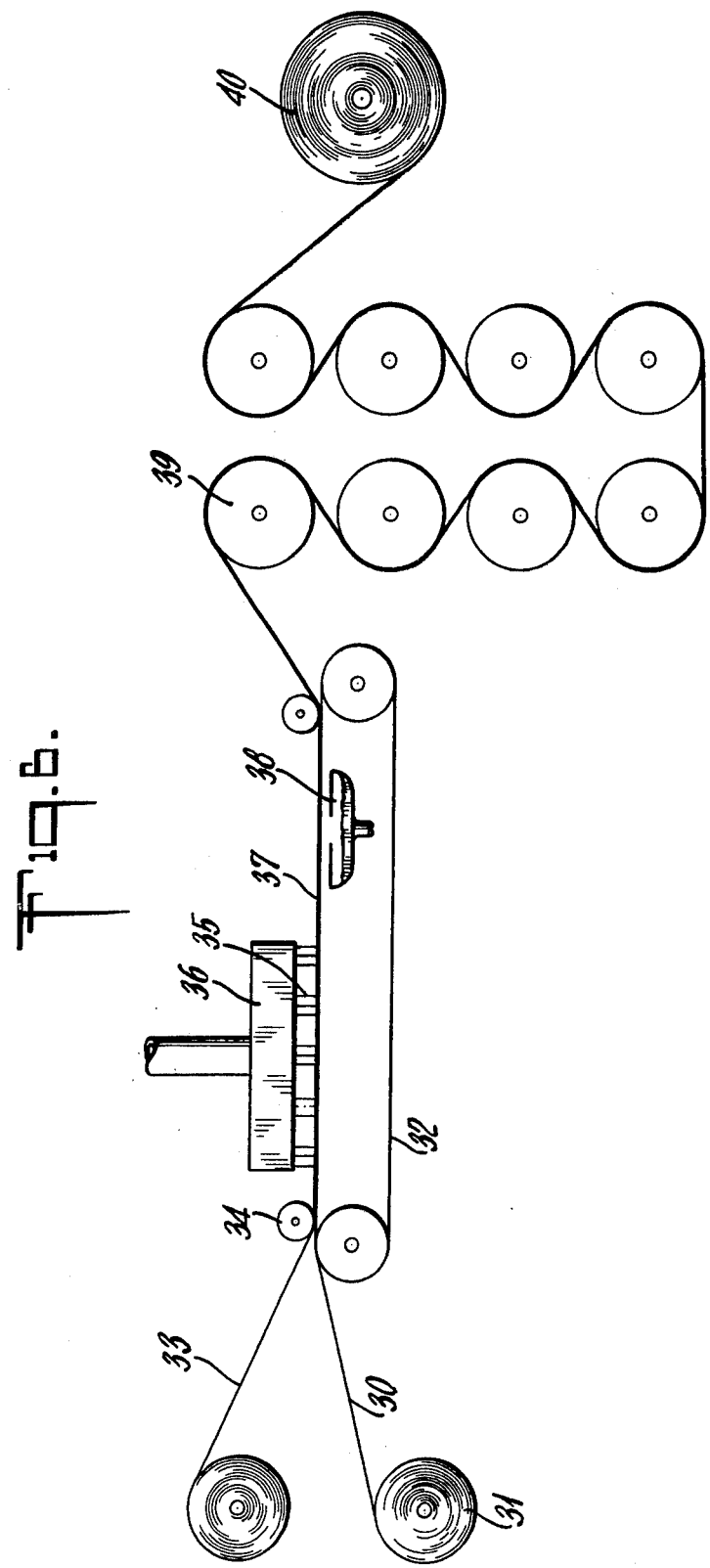
FIG. 6 is a schematic plan view of one form of apparatus for carrying out the method of the present invention.

Referring to the drawings, in FIG. 1 there is shown one embodiment of the new textile fabric according to the present invention. The fabric 15 comprises a base layer 16 which is an open woven fabric. The warp yarns 17 and the filling yarns 18 are woven in a standard one-by-one plain weave with open areas between the crossing yarns. In each of the openings or apertures formed by the crossing yarns, there is an area 19 of highly entangled fibers. The fibers in an area entangle with fibers in adjacent areas as well as entangling with fibers in the yarns in both the warp and the filling directions. This is more clearly seen in FIG. 2 which is a cross-sectional view of the fabric of FIG. 1. In FIG. 2, the warp yarns 17 comprise fibers 20 aligned in the direction of the yarn. The yarns are spaced uniformly across the width of the fabric. Between each yarn there is a highly entangled area 19 of fibers. Portions of the fibers in each of the entangled areas are entangled with the fibers in the warp yarns themselves and are also entangled with portions of fibers in adjacent entangled areas.

The fabric of FIGS. 1 and 2 can be used to illustrate several distinctive features of the invention. First, the base layer 16 and second layer (19) are substantially coplanar. In actual practice, the degree of coplanarity may be somewhat less than is shown in FIG. 2, since FIGS. 1 and 2 are idealized illustrations. Nevertheless, the two layers will clearly lie in the same plane, rather than one on top of the other. Another distinctive feature is that the base layer 16 has a structure or fiber arrangement that is clearly identifiable as having been derived from the base layer fabric used to produce the fabric of the invention. While the process of the invention may alter the base layer fabric to a degree, it will be relatively unchanged in that it will be recognizable as the original base layer fabric in the finished fabric. This is not the case with the second layer. The structure or arrangement of fibers in the second layer bears no necessary relationship to the structure or arrangement of these fibers before processing.

Figure 10:
FIG. 10 is a photomicrograph in plan view of a portion of another embodiment of the new textile fabric according to the present invention showing the top surface.
Figure 11:
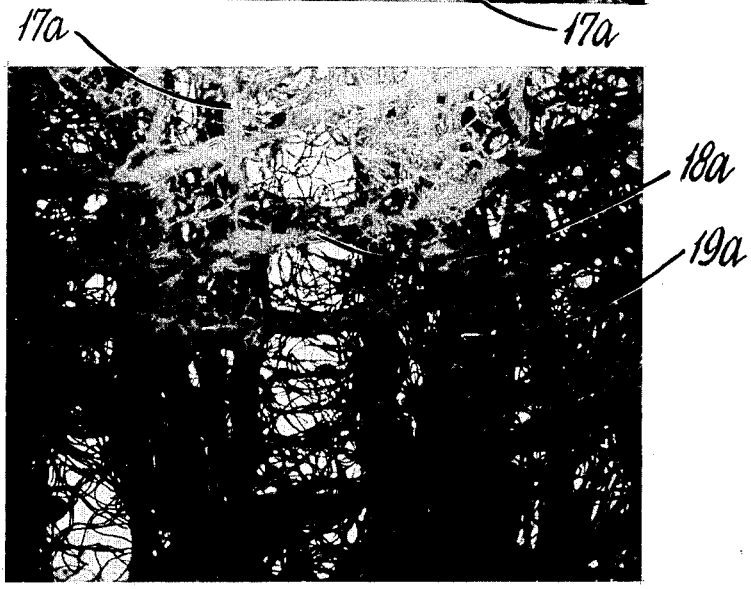
FIG. 11 is a photomicrograph in plan view of the opposite surface of the fabric as shown in FIG. 10.
Figure 12:
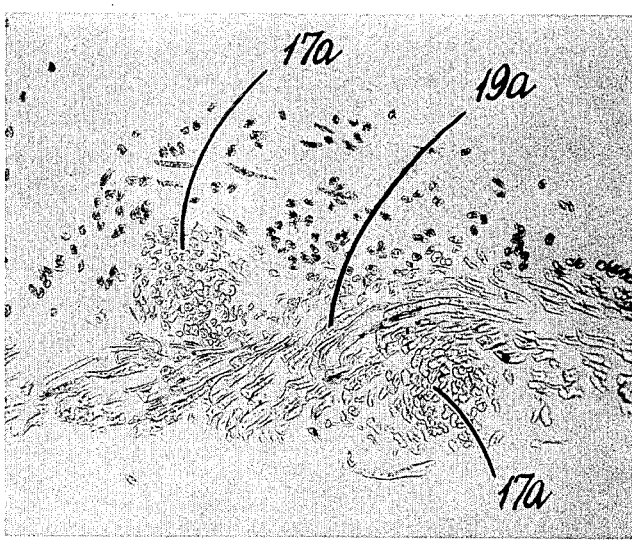
FIG. 12 is a cross-sectional view of the fabric shown in FIG. 10.

Photomicrographs of this embodiment of the new textile fabric of the present invention are given in FIGS. 10, 11 and 12. The front and back surfaces of the fabric are shown in FIGS. 10 and 11 respectively. The warp yarns 17a and the filling yarns 18a are more clearly shown in FIG. 11 though they are also apparent to some degree in FIG. 10. Highly entangled fiber areas 19a are disposed generally in the openings formed by the warp and filling yarns. Not every opening is completely filled with highly entangled fibers but the openings are filled to different degrees. In FIG. 12, the cross-sectional view, the warp yarns 17a are shown with highly entangled fiber areas 19a disposed between warp yarns. Portions of fibers in the highly entangled areas, wrap around, twist and entangle with the warp yarns and with portions of fibers from adjacent highly entangled areas in a non-uniform manner.

In FIGS. 3 and 4, there is shown another embodiment of the new fabric of the present invention wherein the base layer is a nonwoven fabric 21. The base layer is made in accordance with U.S. Pat. No. 2,862,251 and comprises a plurality of yarn-like fiber bundles 22 which define a pattern of openings therebetween. The yarn-like bundles are interconnected at junctures 23. Disposed within each opening is an area 24 of highly entangled fibers. Portions of fibers from each area are entangled with adjacent areas as well as being entangled within the fibers of the base fabric.

Figure 7:
FIG. 7 is a photomicrograph in plan view of the top surface of a new textile fabric according to the present invention.
Figure 8:
FIG. 8 is a photomicrograph of the back surface of the fabric shown in FIG. 7.
Figure 9:
FIG. 9 is a cross-sectional view of the fabric shown in FIG. 7.

Photomicrographs of a somewhat similar fabric are shown in FIGS. 7, 8 and 9. In this fabric the base layer 21a is a nonwoven fabric comprising a plurality of yarn-like bundles 22a which define a pattern of openings arranged in a square pattern rather than the staggered pattern depicted in FIG. 5. The front surface of the fabric is shown in FIG. 7 and the back surface in FIG. 8. Within the openings of the base layer are disposed highly entangled fiber areas 24a. Because of the looseness of the yarn-like bundles of the base layer, it is extremely difficult to pick out the fibers forming the yarn-like bundles from those fibers in the highly entangled fiber areas. This is clearly seen in the cross-sectional view of the fabric shown in FIG. 9. Portions of fibers from the highly entangled fiber areas are intimately mixed and entangled with fibers from yarn-like bundles and with fibers from adjacent highly entangled fiber areas.

In FIG. 5, there is shown another embodiment of the new fabric of the present invention wherein the base layer comprises a simple knit fabric 26 and disposed within the openings of the knit fabric are the highly entangled fibrous areas 27.

The base layers used to produce the new fabrics of the present invention must have two essential characteristics. First, the layer must contain apertures or openings in the layer and second, the layer must also contain either yarn areas or yarn-like areas. Examples of suitable fabrics are the open woven or the open knitted fabrics. These fabrics have openings or apertures in them and are made from yarns. It is preferred when using such fabrics that the yarns themselves be of low twist, fairly heavy and fairly loosely twisted to allow for the second or upper layer to better entangle within the base layer. Also suitable as a base layer are the nonwoven fabrics which contain openings and apertures and also contain yarn-like areas or areas wherein portions of fibers are parallelized and in close proximity to each other. Examples of such fabrics are the fabrics made in accordance with U.S. Pat. Nos. 2,862,251 or 3,485,706. When using nonwoven fabrics, in order to obtain maximum strength in the finished fabric, it is preferred that there be portions of the fabric wherein the fibers are locked in place such as described in U.S. Pat. No. 3,485,706. In such fabrics, highly entangled areas hold fibers in place and these are connected by portions of fibers which are yarn-like in nature. If a fabric such as is described in U.S. Pat. No. 2,862,251 is used, it may in some instances be desirable to place a binder on the fabric to aid in the locking of the fibers. The binder itself will not disrupt the other processes of the present invention.

The second layer of the fabric of the present invention comprises a plurality of fibers disposed in a configuration of highly entangled areas. The highly entangled areas are disposed in a complementary manner so that they are inserted in each of the openings or apertures of the base layer. Portions of the fibers in each of the highly entangled areas connect with adjacent entangled areas and other portions of the fibers in each of the entangled areas are entangled with the fibers in the yarn-like areas of the base layer to produce an integral, nonapertured textile fabric.

The resulting fabrics may have various properties depending upon the type of base layer used and the type of fibers used in the second layer. For example, a different fiber may be used in one layer than in the other to obtain in one fabric the desirable properties of both types of fibers. In some instances the same fibers may be used in both layers to obtain high absorbency or softness as desired. The base layer may be a woven fabric to provide excellent strength or it may be a nonwoven fabric to obtain high absorbency and softness or various combinations of types of base layer and classes of fibers.

The method of manufacturing fabrics according to the present invention will be described in conjunction with FIG. 6. The base layer 30 as described above, is let off from a suitable roll 31 and placed on a permeable conveyor 32. A fibrous web 33 is placed on top of the base layer 30. The web 33 may be made by standard carding operations, air-laying operations, wet-laying operations or if desired, fibers can be deposited directly on the base layer 30. The composite layers 37 are passed under a pressing roll 34. The pressed composite layers 37 are treated by passing the two layers 37 under a plurality of liquid streams 35. Preferably these streams are under fairly high pressure of about 200 pounds per square inch or more. The orifices used to direct the streams may have a round configuration and a diameter of from 0.003 inch to 0.015 inch. Other configurations of orifices such as squares, rectangles, etc. may also be used. The orifice streams are longitudinally and transversely spaced over the composite layers 37 and are directed from a suitable manifold 36. About 50 to 12 orifices per inch of width of the layers 37 is used for round orifices having diameters of about 0.003 to 0.015 inch, respectively. The density of the orifices may vary widely depending on the number of manifolds used and the number of rows of orifices in each manifold.

The permeable conveyor 32 on which the composite layer 37 is placed has certain critical parameters in order to obtain the advantages of the present invention. The conveyor 32 should contain from about 1500 to 90,000 openings per square inch and should have an open area of from about 30 percent to 70 percent.

Surprisingly, if these parameters are met in the backing member, the liquid streams will rearrange the fibers in the fibrous web layer 33 to produce highly entangled areas within the openings of the base layer 30. Fiber portions from these entangled areas are connected to adjacent entangled areas. Other fiber portions of the entangled areas are connected to the yarn-like fiber areas of the base layer 30. If the above described parameters are not met, the resultant fabric will contain either a pattern of apertures (if the permeable conveyor is too open) or the fabric will not contain highly entangled areas (if the permeable conveyor is insufficiently open).

After having been passed under the liquid streams 35, the composite layer 37 is passed over a vacuum slot 38 to remove excess water. The composite layer 37 then passes about a series of drying cans 39 to dry the fabric and the resultant integral fabric is wound up on a standard wind-up mechanism 40.

A number of theories have been propounded as to why my new fabric is being formed in the manner that it is. However, I have been unable to either prove or disprove these theories. What I have discovered is: if I use a base layer which has portions of the layer with fibers arranged in a configuration of yarns or yarn-like bundles and I overlay a web of fibers on top of this base layer and treat the two layers as herein described, I produce the new textile fabric as previously described.

The invention will be further illustrated in greater detail by the following examples. It should be understood, however, that although the examples may describe in particular detail some of the more specific features of the invention, they are given primarily for purposes of illustration and the invention in its broader aspects is not to be construed as limited thereto.

EXAMPLE 1

A base fabric made in accordance with U.S. Pat. No. 2,862,251 is placed on a foraminous conveyor belt. The base fabric is made from 1½ inch long, 1½ denier rayon fibers. The fabric has approximately 95 holes or apertures per square inch arranged in a staggered pattern. The holes are surrounded and defined by yarn-like fiber bundles. The fiber portions in the bundles are parallel and in close proximity to each other. The base fabric weighs approximately 750 grains per square yard. An air-laid isoweb is placed on top of the base fabric. The isoweb weighs about 350 grains per square yard and is made from 1½ inch long, 1½ denier rayon fibers.

The foraminous conveyor used is a woven polyester filament belt woven with 89 warp yarns and 89 filling yarns. The belt has 7921 openings per square inch and about 42 percent open area. The belt with the laminate thereon is passed under a manifold of orifice slots. The manifold comprises 22 transverse rows of orifices. The orifices are rectangular slots about 0.012 inch by 0.014 inch with 12 slots per inch in each row. The manifold is set approximately one inch above the laminate. Water is jetted through the slots at 200 to 250 pounds per square inch while the laminate passes under the manifold at about 7 yards per minute. The water jets rearrange the upper isoweb into a pattern of highly entangled areas and disposes the highly entangled areas complementary to the pattern of holes or apertures in the base layer. The highly entangled areas substantially fill the holes in the base layer. Portions of fibers from the entangled areas interconnect in and around the yarn-like bundles of the base layer and also interconnect with fiber portions of adjacent highly entangled areas. The rearranged composite fabric is passed over a vacuum slot to remove excess water and is dried on a stack of dry cans. The resultant fabric has good strength and absorbency. The two layers are integrated and cannot be separated into individual, identifiable layers. The fabric can be used as toweling, or curtains or other furnishing uses and may also be used as a bandage, sanitary dressing cover or other medical uses.

EXAMPLE II

The procedures of Example I are followed substantially as set forth therein with the exception that the base layer used in a cotton gauze fabric. The gauze is woven in a plain weave with 28 warp yarns per inch and 24 filling yarns per inch. Comparable results are obtained.

EXAMPLE III

The procedures of Example I are followed substantially as set forth therein with the exception that the base layer used in a rayon knit fabric. The knit fabric is a plain jersey knit using 12 to 13 stitches per inch of yarn. The knit fabric has 18 courses by 18 wales. Comparable results are obtained.

EXAMPLE IV

The procedures of Example I are followed substantially as set forth therein with the exception that the base layer has been bonded with a viscose binder. About 6 percent by weight of the layer of viscose is used and the viscose is deposited in an intermittent pattern of binder areas in a cross-hatch configuration. Comparable results are obtained.

EXAMPLE V

The procedures of Example I are followed substantially as set forth therein with the exception that the isoweb upper layer comprises 1½ inch, 1½ denier polyester fibers. Comparable results are obtained.

EXAMPLE VI

The procedures of Example I are followed substantially as set forth therein with the exception that the foraminous belt used is a 40 by 40 woven wire belt. The belt has approximately 1600 openings per square inch and 46 percent open area. The manifold used in this Example comprises 10 transverse rows of orifices. Each orifice is 0.005 inch in diameter and the orifices are spaced in each row at 50 per inch. Water is jetted through the orifices at about 450 pounds per square inch. Comparable results are obtained.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. a double layer fabric consisting essentially of a base layer and a second layer substantially coplanar and integrally entangled with said base layer, said base layer consisting essentially of a plurality of fibers arranged in a pattern of yarn-like bundles which define a pattern of apertures in said base layer, said second layer consisting essentially of a plurality of highly entangled fiber areas, wherein said highly entangled fiber areas are arranged in a complementary pattern to the pattern of the base layer, wherein said fiber areas are disposed in the apertures of said base layer whereby the double layer fabric is nonapertured, and wherein portions of said fibers of said entangled fiber areas are wrapped and entangled with portions of fibers of said base layer.

2. A double layer fabric according to claim 1 wherein the base layer is a nonwoven fabric.

3. A double layer fabric according to claim 1 wherein the base layer is a woven fabric.

4. A double layer fabric according to claim 1 wherein the base layer is a knit fabric.

5. A double layer fabric according to claim 1 wherein the fibers in the base layer are rayon fibers and the fibers in the second layer are rayon fibers.

6. A double layer fabric according to claim 1 wherein the fibers in the base layer are polyester fibers and the fibers in the second layer are polyester fibers.

7. A double layer fabric according to claim 1 wherein the fibers in the base layer are cotton fibers and the fibers in the second layer are polyester fibers.

8. A method of manufacturing a nonapertured textile fabric comprising placing a base layer and a second layer on a foraminous support member, said base layer containing a pattern of openings and a pattern of yarn-like fiber bundles, said second layer comprising a web of overlapping, intersecting fibers, said second layer being placed on top of said base layer, said foraminous support member having from 1600 to 90,000 openings per square inch and from 30 to 70 percent open area, treating said laminate while supported on said foraminous support member with longitudinally and transversely spaced streams of liquid to rearrange said fibers in said layer into highly entangled fiber regions disposed within the openings in the base layer while leaving the fiber configuration in the base layer relatively unchanged.

9. A method according to claim 8 wherein the base layer is a nonwoven fabric.

10. A method according to claim 8 wherein the base layer is a woven fabric.

11. A method according to claim 8 wherein the base layer is a knit fabric.

12. A method according to claim 8 wherein the second layer is an air-laid isoweb.

13. A method according to claim 8 wherein the second layer is a carded web.

14. A method according to claim 8 wherein the spaced streams of liquid are jets of water.

15. A method according to claim 14 wherein the jets of water are directed against the laminate at a pressure of at least 200 pounds per square inch.

* * * * *